United States Patent [19]

Hanawa

[11] Patent Number: 4,908,848

[45] Date of Patent: Mar. 13, 1990

[54] APPARATUS FOR CONTROLLING CALLS IN A MOBILE COMMUNICATION SYSTEM

[75] Inventor: Tetsuya Hanawa, Yokohama, Japan

[73] Assignee: Fujitsu Limited, Kawasaki, Japan

[21] Appl. No.: 180,553

[22] Filed: Apr. 12, 1988

[30] Foreign Application Priority Data

Apr. 13, 1987 [JP] Japan ................................. 62-88695

[51] Int. Cl.4 ............................................ H01M 1/26
[52] U.S. Cl. ......................................... 379/63; 379/58
[58] Field of Search ............. 379/58, 61, 63, 188–200, 379/62; 455/89

[56] References Cited

U.S. PATENT DOCUMENTS

| 4,232,200 | 11/1980 | Hestad et al. | 379/188 |
|---|---|---|---|
| 4,251,692 | 2/1981 | Waldman | 379/200 |
| 4,358,640 | 11/1982 | Murray | 379/200 |
| 4,411,017 | 10/1983 | Talbot | 379/58 |
| 4,511,765 | 4/1985 | Kuo | 379/200 |
| 4,585,904 | 4/1986 | Mincone et al. | 379/200 |
| 4,612,419 | 9/1986 | Smith | 379/200 |
| 4,724,537 | 2/1988 | Monet | 379/63 |

Primary Examiner—Robert Lev
Attorney, Agent, or Firm—Staas & Halsey

[57] ABSTRACT

In an mobile communication system having a transmitting and receiving unit, a control unit, and a handset in a mobile station, it is possible to fix a restriction against a use of a specific function of the mobile communication system, or it is possible to change a restriction against a use of a specific function of the mobile communication system after inputting a security code, enabling the use of only one kind of control unit in the handset.

7 Claims, 6 Drawing Sheets

| D1 | D2 | CONTENTS |
|---|---|---|
| 0 | 0 | MANUAL LOCK—CALLS CANNOT BE PLACED (KEYPAD PROGRAMMABLE) |
| 0 | 1 | MANUAL LOCK—CALLS CANNOT BE PLACED OR RECEIVED |
| 1 | 0 | AUTOMATIC LOCK—CALLS CANNOT BE PLACED |
| 1 | 1 | AUTOMATIC LOCK—CALLS CANNOT BE PLACED OR RECEIVED |

Fig. 7B

| D3 | D4 | D5 | CONTENTS |
|---|---|---|---|
| 0 | 0 | 0 | NO CALL RESTRICTION (KEYPAD PROGRAMABLE) |
| 0 | 0 | 1 | NO MEMORY ACCESS (MEMORY DIALLING INHIBITED) |
| 0 | 1 | 0 | RESTRICTED LONG DISTANCE CALLS |
| 0 | 1 | 1 | RESTRICTED MEMORY ACCESS AND LONG DISTANCE CALLS |
| 1 | 0 | 0 | MEMORY ACCESS ONLY (MEMORY DIALLING ONLY) |

Fig. 7C

| D6 | D7 | CONTENTS |
|---|---|---|
| 0 | 0 | NO ACCUMULATION (KEYPAD PROGRAMMABLE) |
| 0 | 1 | 6 SECONDS INTERVAL |
| 1 | 0 | 30 SECONDS INTERVAL |
| 1 | 1 | 60 SECONDS INTERVAL |

APPARATUS FOR CONTROLLING CALLS IN A MOBILE COMMUNICATION SYSTEM

BACKGROUND OF THE INVENTION (1) Field of the Invention

The present invention relates to an apparatus for controlling a call in a mobile communication system having lock, call restriction and accumulated call timer functions wherein the handset can be programmed.

(2) Description of the Related Art

The automobile has become indispensable in contemporary life, and comfort and convenience when driving has become increasingly important. To this end, vehicles can be provided with a mobile communication system which can be used as a telephone system.

An automobile equipped with a mobile communication system, e.g., a mobile radio telephone system, is called a mobile station, and this mobile station can communicate not only with a fixed telephone such as a telephone in an office or at home but also with another mobile station. This communication is established by radio waves between the mobile station and a land station, and transferred to a conventional telephone system at the land station.

In accordance with the increasing use of automobiles, the number of mobile stations has also increased, namely, not only private cars but also company cars or rental cars are now equipped with a mobile radio telephone system (are now mobile stations).

If the owner of the mobile station makes personal use of the mobile radio telephone, no problem arises, but when a person who is not the owner of the car equipped with the mobile radio telephone uses the telephone, for example when a employee uses the telephone system in a company car, or when an employee of a rent-a-car company uses the mobile telephone system after the rental car has been returned to the company, problems arise which can cause trouble for the owner of the mobile station.

Accordingly, some mobile stations are now equipped with an apparatus for restricting specific functions of the mobile radio telephone, for example, an apparatus for inhibiting an outgoing call, an apparatus for inhibiting a long distance call, or an apparatus for inhibiting memory dialling. Usually, the restriction of the outgoing call or the long distance call is used most in company cars, and the restriction of memory dialling or long distance calls is used most in private cars. The mobile radio telephones having those restrictions are divided into two types, a fixed type and a handset programmable type. The user of the mobile radio telephone cannot change the type of restriction in the fixed type, but in the handset programmable type, the user can change the type of restriction by inputting predetermined information from a dial or a keypad of the handset of the mobile radio telephone after an input of a registered security code. Therefore, the owner of the mobile station is faced with a choice between these two types when obtaining a mobile radio telephone from a telecommunication company.

Those two types are now explained in detail.

(1) Fixed type

There are, for example, four modes of restriction in the fixed type, as follows:
MODE 1: calls cannot be placed;
MODE 2: calls cannot be received;
MODE 3: long distance calls cannot be placed;
MODE 4: no call restriction.

The mobile radio telephone is provided with a transmitting and receiving unit and a call control unit. The control unit comprises a read only memory (ROM) called an ID (identification) ROM, wherein a telephone number and an identification number of the home mobile communication system to which the radio telephone is linked are stored. One of the MODE 1 to MODE 4 is stored in the ID-ROM when the mobile radio telephone is linked to the mobile communication system. The selection of the MODE is decided by the owner of the mobile station. Once one of the MODE 1 to MODE 4 is stored in the ID-ROM, that MODE cannot be changed by a user or the owner of the mobile radio telephone.

(2) Handset programmable type

There are, for example, six modes of restriction in the handset programmable type, as follows:
MODE 1: calls cannot be placed:
MODE 2: calls cannot be received;
MODE 3: long distance calls inhibited;
MODE 4: memory dialling inhibited:
MODE 5: memory dialling and long distance calls inhibited;
MODE 6: no call restriction.

Note, the control unit is equipped with a random access memory (RAM) in addition to the ID-ROM. The ID-ROM is provided with areas for storing a telephone number, an identification number of the home mobile communication system to which the radio telephone is linked, the above-described six MODEs, a selection command for each of the six MODEs, and a security code for confirming that the person changing the MODE is allowed to do so. When the mobile radio telephone is linked to the mobile communication system, the selection of the MODE and the security code are made by the owner of the mobile station, and are written in the ID-ROM. The selected MODE is written in the RAM when the power is applied to the mobile radio telephone, and subsequently, the mobile telephone system is operated under the restriction of the MODE stored in the RAM. The MODE can be changed after an input of the security code by a user of the mobile telephone system.

Note that in the above mentioned mobile radio telephone, the ID-ROM for the fixed type and the ID-ROM for the handset programmable type are different. Namely, in the ID-ROM for the fixed type, only one of four MODEs is stored, and in the ID-ROM for the handset programmable type, all of six MODEs, a security code for mode change, and the MODE selection commands are stored. Here, the control unit must be equipped with a RAM for storing the MODE selection.

Accordingly, the manufacture of mobile radio telephones must produce separate control units for the fixed type and the handset programmable type, which increases the manufacturing cost of the mobile radio telephone.

SUMMARY OF THE INVENTION

An object of the present invention is to provide an apparatus by which either a "fixed type" or "handset programmable type" restriction of specific functions of the mobile radio telephone is selectable with one ID-ROM.

According to the present invention, the manufacturers need produce only one kind of ID-ROM and the owner of the mobile station can select the fixed type or handset programmable type of the mobile radio telephone, when linking-up with the mobile communication system. If the owner of the mobile station has selected the handset programmable type, the user of the mobile station can change the type of call restriction by inputting a security code and information which designates the type of restriction from a dial or keypad of the handset.

BRIEF EXPLANATION OF THE DRAWINGS

The present invention will be more clearly understood from the description as set forth below with reference to the accompanying drawings, wherein.

DESCRIPTION OF THE PREFERRED EMBODIMENTS

Figure 1:
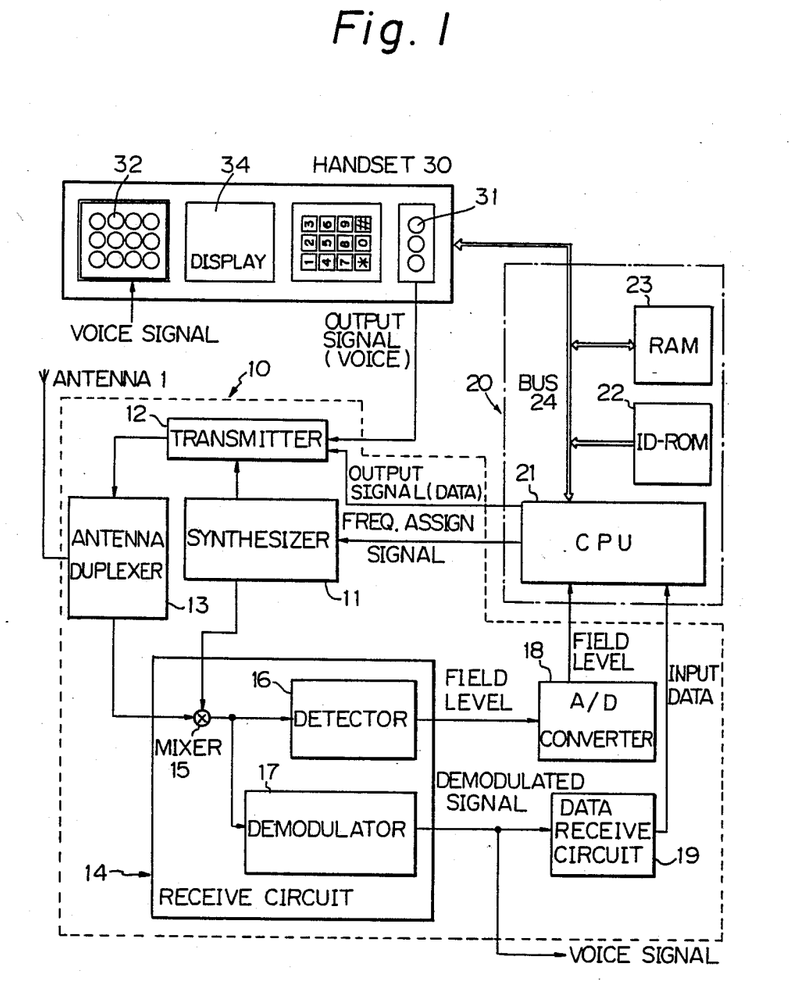
FIG. 1 is a schematic circuit diagram of a mobile station according to the present invention.

FIG. 1 is a circuit diagram of one embodiment of an apparatus for controlling a call in a mobile communication system according to the present invention. This apparatus is provided with an antenna 1, a transmitting and receiving unit 10, a control unit 20, and a handset 30.

The antenna 1 is connected to an antenna duplexer 13 of the transmitting and receiving unit 10. The transmitting and receiving unit 10 also includes a synthesizer 11, a transmitter 12, a receive circuit 14 which includes a mixer 15, a detector 16 and a demodulator 17, an A/D converter 18, and a data receive circuit 19. The control unit 20 comprises a central processing unit (CPU) 21, an ID-ROM 22, and a random access memory (RAM) 23, which are connected by a bus line 24. The handset 30 comprises a microphone 31, a speaker 32, pushbutton digits (key pad) 33, and a display 34 which displays data input from the keypad.

With regard to the transmitting portion of the transmitting and receiving unit 10, the transmitter 12 is connected to the CPU 21, which assigns a frequency to the synthesizer 11. The synthesizer 11 delivers a synthesized frequency to the transmitter 12 and the mixer 15 of the receive circuit 14. Voice or data signals to be transmitted are delivered to the transmitter 12 from the microphone 31 of the handset 30 or from CPU 21, which then modulates these voice or data signals using the synthesized frequency delivered from the synthesizer 11, as a carrier frequency. The transmitter 12 also amplifies the power and delivers the modulated frequency to the antenna 1 to be transmitted to the land station via the antenna duplexer 13. In this transmitting portion, the CPU 21 changes the frequency assigned to the synthesizer 11 and changes the channel of the dedicated control channel or voice channel.

With regard to the receiving portion of the transmitting and receiving unit 10, the receive circuit 14 is connected to the antenna 1 via the antenna duplexer 13. The mixer 15 of the receive circuit 14 mixes an input signal received by the antenna 1 with a signal from the synthesizer 11 and changes these signals to an intermediate frequency. The detector 16 detects the field level of the input signal received by the antenna 1, and delivers the detected field level to the A/D converter 18. This field level is converted from an analog level to a digital level by the A/D converter 18 and is delivered to the CPU 21. The demodulator 17 demodulates the voice or data signal from the intermediate frequency, and the voice signal is sent to the speaker 32 of the handset 30. The data signal is picked up from the demodulated signal by the data receive circuit 19, and delivered to the CPU 21.

The CPU 21 stores the field level and input data in a RAM 23 during the scan of the dedicated control channels, then selects the most suitable dedicated control channel from the stored field level and the stored input data, and tunes in to the selected dedicated control channel. The handset 30 is connected to the CPU 21 through a bus line 24 and data input from the keypad 33 is indicated by the display and delivered to the CPU 21.

Figures 2, 3:
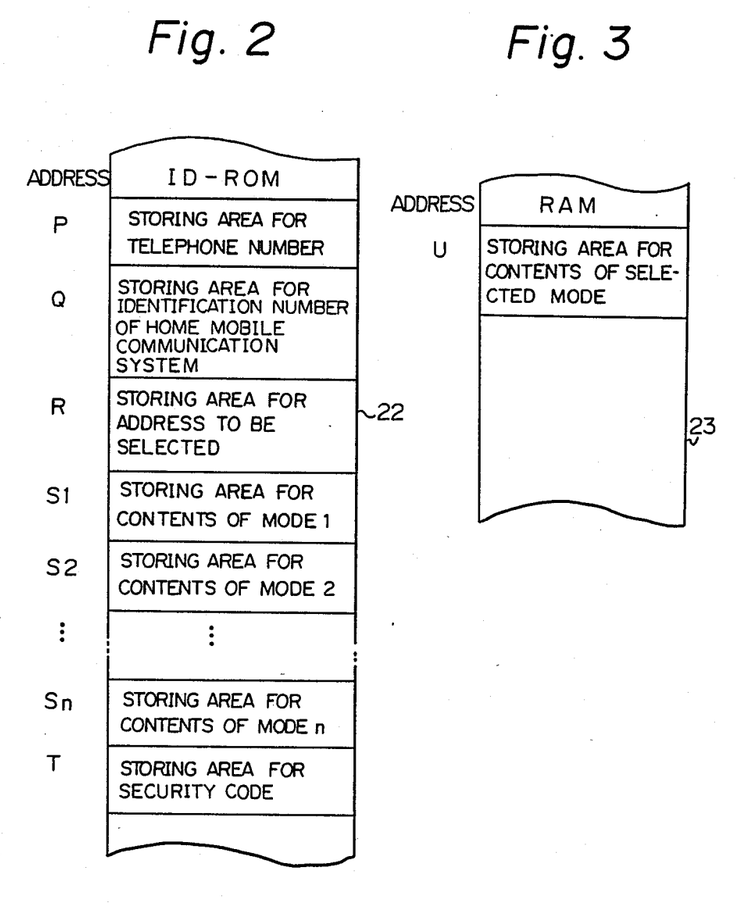
FIG. 2 is a diagram showing an example of the contents of an ID-ROM in the control unit of FIG. 1.
FIG. 3 is a diagram showing an example of the contents of a RAM in the control unit of FIG. 1.

FIG. 2 shows an example of part of the contents of the ID-ROM 22 in the control unit 20. The storing areas in the ID-ROM 22 correspond to the addresses thereof. In FIG. 2, the addresses P to T and the contents thereof are shown. In this embodiment, an address P is a storing area for the telephone number of the mobile radio telephone, an address Q is a storing area for the identification number of the home mobile communication system to which this mobile station is linked, an address R is a storing area for an address by which one of MODE 0 to MODE n is selected, addresses S1 to Sn are storing areas for the contents of MODE 1 to MODE n, and an address T is a storing area for a security code which will be used to check the code input by the user of the mobile radio telephone.

FIG. 3 shows an example of part of the contents of the RAM 23 in the control unit 20. In FIG. 3, only an address U of the RAM 23 is shown; this address U is an area for storing the contents of the selected MODE by the written address stored in address R or the address input from the keypad.

For example, seven restriction MODEs can be prepared for the mobile radio telephone, as follows:

MODE 0: keypad programmable;
MODE 1: no call restriction;
MODE 2: calls cannot be placed;
MODE 3: calls cannot be received;
MODE 4: long distance calls inhibited;
MODE 5: memory dialling inhibited; and
MODE 6: memory dialling and long distance calls inhibited.

One of the addresses S1 to S6 or the address 00 is stored in the address R of the ID-ROM 22. If one of the addresses S1 to S6 is stored in the address R of the ID-ROM 22, one of contents from MODE 1 to MODE 6 corresponding to the written address is selected and stored in the address U of the RAM 23. And if the address 00 is stored in the address R of the ID-ROM 22, the contents of the address U of the RAM 23 can be changed by the user of mobile radio telephone after the user has input a code for a mode change and a security code for confirming the user is allowed to do so, in this order. The code input by the user is indicated in a display 34 of the handset 30 in FIG. 1.

Figure 4:
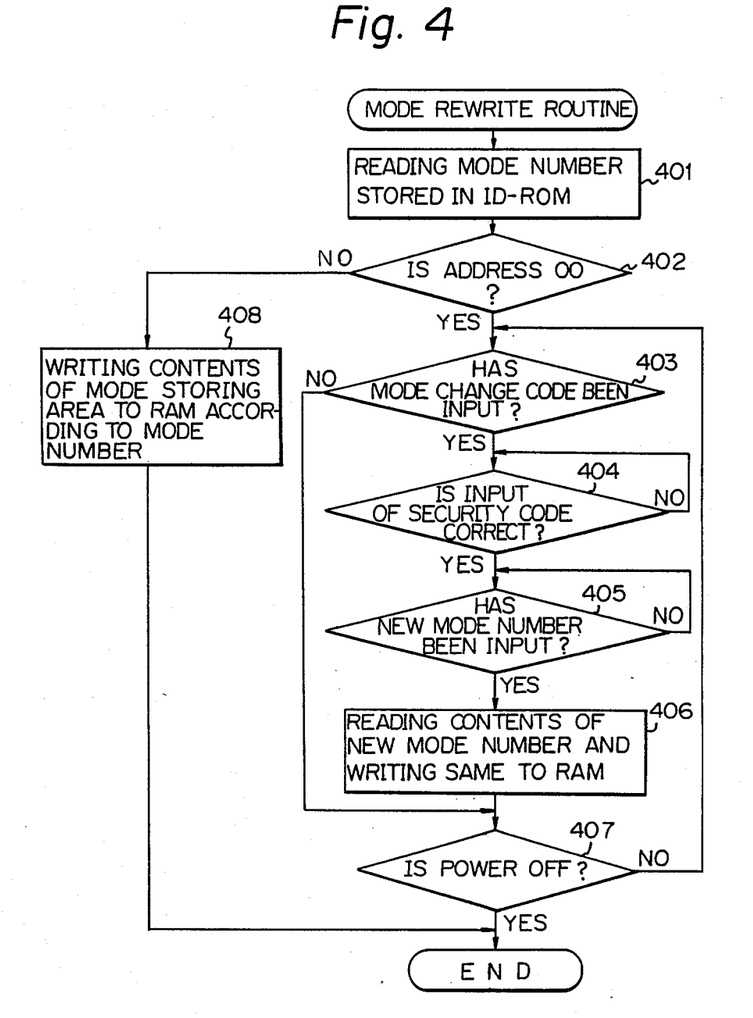
FIG. 4 is a flowchart for explaining an example of a mode change operation of a CPU shown in FIG. 1.

The operation of the control unit 20 of FIG. 1 for changing the contents of selected MODE storing area in RAM 23, will be explained with reference to the flowchart of FIG. 4. FIG. 4 shows a routine for changing a MODE in the RAM 23 of the mobile radio telephone, and is executed while power is supplied.

At step 401, the control reads the address R of the ID-ROM 22 and obtains the written address of the MODE to be selected. Then at step 402, it is determined whether or not the address is 00. If the address is not 00, the control proceeds to step 408 and the contents of the mode storing area of the ID-ROM 22 are written to the RAM 23 according to the written address read out at step 401, and this routine then ends at step 409. For example, if the written address in the address R is S2, a command indicating that "calls cannot be placed" is written to the address U of the RAM 23.

If the written address is 00 at step 402, the control proceeds to step 403. At step 403, it is determined whether or not a mode change code has been input by the user of the mobile radio telephone from the keypad 33 of handset 30. If the mode change code has not been input, the control proceeds to step 407, where it is determined whether or not the power to the mobile radio telephone is OFF. And if the power of mobile radio telephone is not OFF, the control proceeds to step 403 and it is again determined whether or not a mode change code has been input by the user. This repetition continues until an input of the mode change code is made or the power is switched OFF.

If a mode change code has been input at step 403, the control proceeds to step 404 and it is determined whether or not a correct security code has been input by the user of the mobile radio telephone. If the correct security code has been input, the control will not proceed to step 405, but if the correct security code has been input, the control then proceeds to step 405, where it is determined whether or not a new MODE number has been input in the form of an address, by the user. If a new MODE number has not been input, the control will not proceed to step 406, but if a new MODE number has been input, the control then proceeds to step 406. At step 406, the control reads the contents of the storing area according to the new MODE number, and writes the contents of the new MODE number to the address U of the RAM 23. Then the control proceeds to step 407 and it is determined whether or not the power to the mobile radio telephone is OFF. If the power is not OFF, the control proceeds to step 403 and waits for a next input of a mode change code, but if the power is OFF at step 407, the control proceeds to step 409 and the routine is ended.

Figure 5:
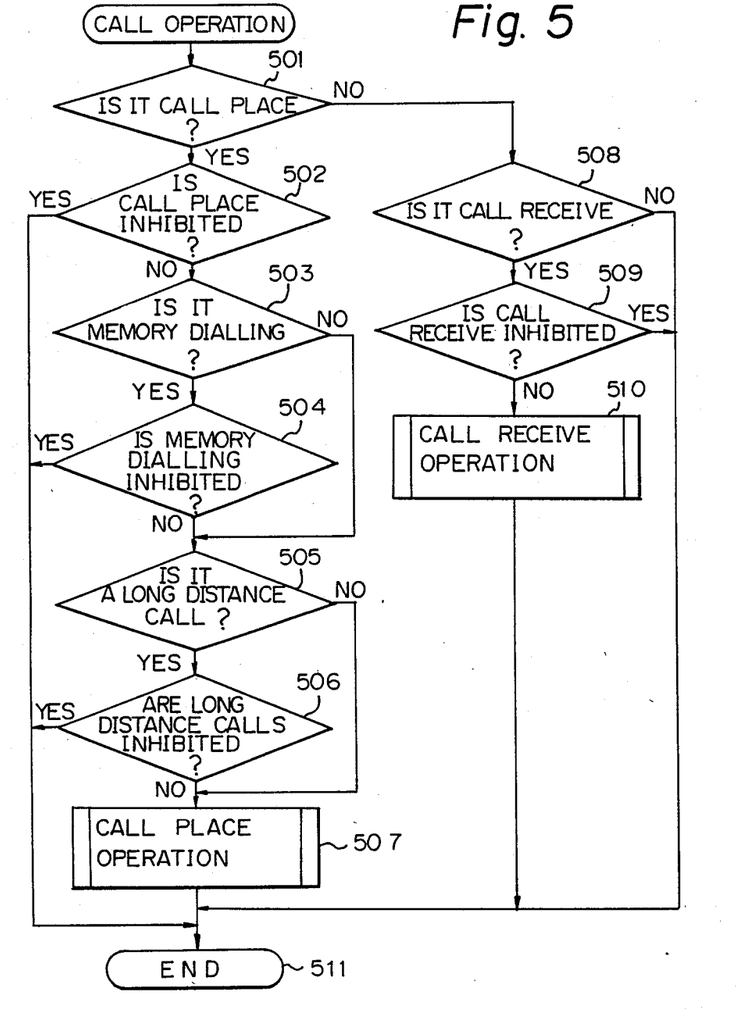
FIG. 5 is a flowchart for explaining an example of a CPU call operation as shown in FIG. 1.

FIG. 5 shows a call operation of the mobile telephone system. At step 501, it is determined whether or not a call is to be placed. If a call is to be placed, the control proceeds to step 502 and it is determined whether or not a call place operation is inhibited. If a call place operation is not inhibited, the control proceeds to step 503 and it is determined whether or not it is memory dialling. If it is memory dialling, the control proceeds to step 504 and it is determined whether or not memory dialling is inhibited. If memory dialling is not inhibited at step 504 or if it is not memory dialling at step 503, the control proceeds to step 505 and it is determined whether or not it is a long distance call. If it is a long distance call, the control proceeds to step 506 and it is determined whether or not long distance calls are inhibited. If long distance calls are not inhibited at step 506 or if it is not a long distance call at step 505, the control proceeds to step 507 and the call place operation is executed. If the call place operation is inhibited at step 502, the memory dialling is inhibited at step 504, or long distance calls are inhibited at step 506, the control proceeds to step 511 and the call place operation is not executed.

If a call is not to be placed at step 501, the control proceeds to step 508 and it is determined whether or not a call is to be received. If a call is to be received, the control proceeds to step 509 and it is determined whether or not a call receive operation is inhibited. If a call receive operation is not inhibited, the control proceeds to step 510 and the call receive operation is executed. If a call is not to be received at step 508 or if a call receive operation is inhibited at step 502, the control proceeds to step 511 and the call receive operation is not executed.

Therefore, in this apparatus, either a "fixed type" or a "handset programmable type" of restriction of specific functions of the mobile radio telephone can be selected with one ID-ROM.

Figure 6A:
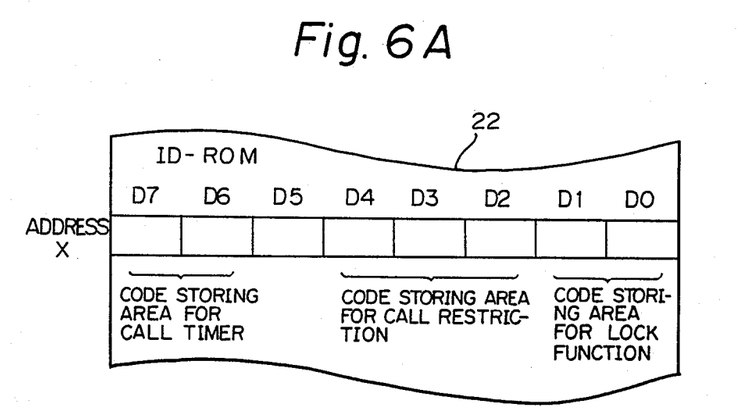
FIGS. 6A–6B are diagrams showing another example of the contents of the ID-ROM in the control unit of FIG. 1, and FIGS. 7A to 7C are charts showing an example of a code and the contents of an ID-ROM in the control unit of FIG. 1.
Figure 6B:
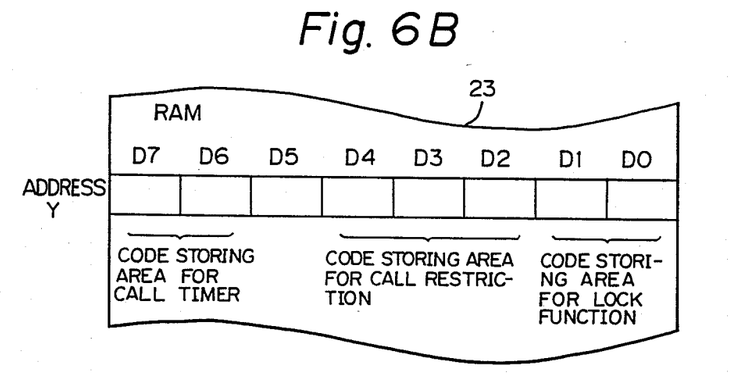

FIGS. 6A and 6B show another example of part of the contents of the ID-ROM 22 and RAM 23 in the control unit 20, in particular, the contents of an address X of ID-ROM 22 and an address Y of RAM 23. In this embodiment, the contents of address X corresponds to the contents of the addresses R and S1 to Sn of the ID-ROM 22 in FIG. 2. In FIG. 6A, the address X consists of 8 parts, i.e., the address X has eight bits D0 to D7, and each bit stores a binary code of "1" or "0". Bits D0 and D1 are the code storing area for the lock function, bits D2 to D4 are the code storing area for the call restriction; and bits D6 and D7 are the code storing area for the call timer. The address Y of the RAM 23 corresponds to the address X of the ID-ROM 22, and the address Y of the RAM 23 is also composed of eight bits D0 to D7, and each bit corresponds to the bits D0 to D7 of the ID-ROM 22, respectively. Accordingly, a type of lock function, call restriction, and call timer is determined by a combination of the binary codes, which are decided and stored in address X when the mobile radio telephone is linked to the mobile communication system. The contents of the code stored in the address X of the ID-ROM 22 are written in the address Y of the RAM 23 when power is supplied to the mobile radio telephone.

Figure 7A:
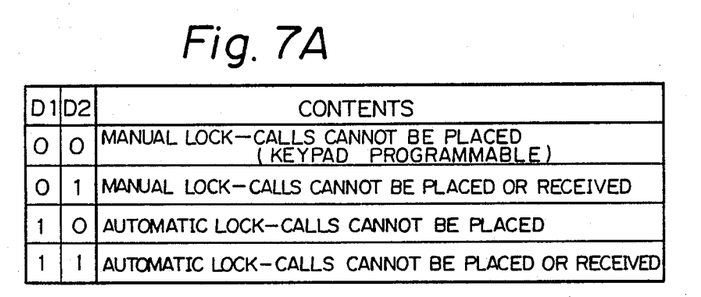
Figure 7B:
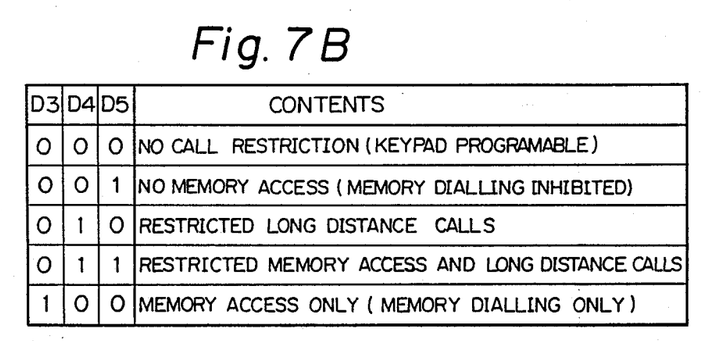
Figure 7C:
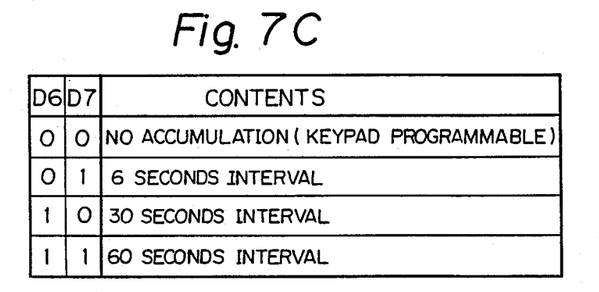

FIGS. 7A to 7C show the types of lock function, call restriction, and call timer. Four kinds of lock functions are shown in FIG. 7A, five kinds of call restrictions are shown in FIG. 7B, and four kinds of call timers are shown in FIG. 7C in this embodiment.

With regard to the lock function in this embodiment, the four types of lock functions are a combination of two restrictions and two locks, i.e., a combination of an outgoing call restriction and an outgoing and incoming call restriction with a manual lock and an automatic lock. The manual lock allows the user to lock the telephone whenever the user wishes by pressing a designated key of the keypad 33. The automatic lock locks the telephone whenever the power is turned ON. In both the manual and automatic locking, calls cannot be placed, but received calls may be locked out depending on the mode selected. The selectable modes are as follows:

1. (code:00) Manual lock—calls cannot be placed;
2. (code:01) Manual lock—calls cannot be placed or received;

3. (code:10) Automatic lock—calls cannot be placed;
4. (code:11) Automatic lock—calls cannot be placed or received. If "0" is stored in both bit D0 and bit D1, the user can change the mode of the lock function, but if at least one "1" is stored in either bit D0 or D1, the user cannot change the lock function mode. To select a lock function when "0" is stored in both bit D0 and bit D1, the user must input a mode change code, a security code, and a code for the mode to be selected, in this order, from the keypad 33 of the handset 30. The selection of the mode is displayed in the form of a code for, for example, 5 seconds at the display 34.

Also, calls placed from the telephone can be restricted. Five restrictions as shown below are provided in this embodiment.

1. (code:000) No call restriction;
2. (code:001) No memory access (storing or recalling number in inhibited);
3. (code:010) Restricted long distance calls;
4. (code:011) Restricted memory access and long distance calls;
5. (code:100) Memory access only (calls can be placed only from memory).

If "0" is stored in all bits D2 to D4, the user can change the mode of the call restriction, but if at least one "1" is stored in either bit D2 to D4, the user cannot change the call restriction mode. To select a lock function when "0" is stored in all bits D2 to bit D4, the user must input a mode change code, a security code, and a code for the mode to be selected, in this order, from the keypad 33 of the handset 30. The selection of the mode is displayed in the form of a code for, for example, 5 seconds at the display 34.

Further, the total talk time elapsed for all calls placed or received is monitored by the call timer (not shown in FIG. 1). The timer starts when a call is initiated and stops when the call is terminated. The timer always rounds the count up to a whole number, even though only a portion of an interval was used. Four timing intervals can be selected in this embodiment, as follows:

1. (code:00) No accumulation of timer. The feature is deactivated;
2. (code:01) 6 seconds interval;
3. (code:10) 30 seconds interval;
4. (code:11) 60 seconds interval.

If "0" is stored in both bit D6 and bit D7, the user can change the mode of the call timer, but if at least one "1" is stored in either bit D6 or D7, the user cannot change the call timer mode. To select an interval of the time in the call timer when "0" is stored in both bit D6 and bit D7, the user must input a mode change code, a security code, and a code for the mode to be selected, in this order, from the keypad 33 of the handset 30. The selection of the mode is displayed for, for example, 5 seconds, in the form of a code at the display 34.

The mode change operation of the control unit 20 for each of the lock function, call restriction, and call timer is exactly the same as the operation shown in FIG. 4 in the previous embodiment, and thus is not explained in this embodiment.

Accordingly, the apparatus of the present invention can select either a "fixed type" or a "handset programmable type" restriction of specific functions of the telephone, with one ID-ROM.

What is claimed is:

1. An apparatus for controlling a call in a mobile communication system provided in a mobile station having a handset, the mobile station operated by a subscriber to a mobile communication service and having functions for restricting calls, said apparatus comprising:
    first storing means for storing first information of functions for restricting call, where the first information cannot be rewritten, said first storing means including
        restriction command storing means for storing restriction commands, each indicating restriction of a specific function of said mobile communication system; and
        selection command storing means for storing a selection command identifying one of said restriction commands in said restriction command storing means;
    second storing means for storing second information based upon the first information from said first storing means, where the second information can be rewritten, the second information including one of the restriction commands from said first storing means in accordance with said selection command stored in said storing means except when said selection command indicates a restrictive mode may be changed;
    rewriting means for rewriting the second information stored in said second storing means in accordance with input information from the handset; and
    restriction means for restricting at least one of incoming and outgoing call operations by the mobile communication system in accordance with the second information stored in said second storing means.

2. An apparatus for controlling a call in a mobile communication system provided in a mobile station having a handset, the mobile station operated by a subscriber to a mobile communication service and having functions for restricting calls, said apparatus comprising:
    first storing means for storing first information of functions for restricting calls, where the first information cannot be rewritten;
    second storing means for storing second information based upon the first information from said first storing means, where the second information can be rewritten;
    rewriting means for rewriting the second information stored in said second storing means in accordance with information input from the handset, said rewriting means including
        means for determining whether a signal for changing a condition of a restrictive mode has been input from the handset;
        means for determining whether a correct security code has been input after the signal for changing the condition of the restrictive mode has been input from the handset; and
        means for determining whether a new restriction command has been input from the handset after input of said correct security code; and
    means for restricting at least one of incoming and outgoing call operations by the mobile communication system in accordance with the second information stored in said second storing means.

3. An apparatus for controlling a call in a mobile communication system provided in a mobile station having a handset, the mobile station operated by a subscriber to a mobile communication service and having functions for restricting calls, said apparatus comprising:
- first storing means for storing first information of functions for restricting calls, where the first information cannot be rewritten, said first storing means including
  - restriction command storing means for storing restriction commands, the restriction commands including a combination of at least two restrictions for indicating restriction of a specific function of said mobile communication system, and
  - selection command storing means for storing a selection command identifying one of said restriction commands in said restriction command storing means,
- second means for storing second information based upon the first information from said first storing means where the second information can be rewritten;
- rewriting means for rewriting the second information stored in said second storing means in accordance with information input from the handset;
- restriction means for restricting at least one of incoming and outgoing call operations by the mobile communication system in accordance with the second information stored in said second storing means.

4. An apparatus as set forth in claim 1, wherein the second information restricting calls is derived from a code included in the first information stored in said first storing means.

5. An apparatus for controlling a call in a mobile communication system provided in a mobile station having a handset, the mobile station operated by a subscriber to a mobile communication service and having functions for restricting calls, said apparatus comprising:
- first storing means for storing first information of functions for restricting calls, where the first information cannot be rewritten;
- second storing means for storing second information derived from a code, included in the first information stored in said first storing means, the code specifying one among a plurality of functions for restricting calls, including an outgoing call restriction, an outgoing and incoming call restriction, a manual lock, an automatic lock, and at least one combination of the restrictions and locks, where the second information can be rewritten;
- rewriting means for rewriting the second information stored in said second storing means in accordance with information input from the handset; and
- restriction means for restricting at least one of incoming and outgoing call operations by the mobile communication system in accordance with the second information stored in said second storing means.

6. An apparatus as set forth in claim 5, wherein the functions for restricting calls further include a memory access restriction, a long distance call restriction, and a combination of the memory access and long distance call restrictions.

7. An apparatus as set forth in claim 6, wherein the functions for restricting calls further include a total talk time count restriction.

* * * * *

UNITED STATES PATENT AND TRADEMARK OFFICE
CERTIFICATE OF CORRECTION

PATENT NO. : 4,908,848

DATED : March 13, 1990

INVENTOR(S) : Hanawa

It is certified that error appears in the above-identified patent and that said Letters Patent is hereby corrected as shown below:

FRONT PAGE [57] ABSTRACT, line 1, "an mobile" should be --a mobile--.

IN THE DRAWINGS

FIG. 7A, line 1, "D1" should be --D0--;
"D2" should be --D1--.

FIG. 7B, line 1, "D3" should be --D2--;
"D4" should be --D3--;
"D5" should be --D4--.

Col. 1, line 35, "a employee" should be --an employee--.

Col. 8, line 6, "call," should be --calls,--.

Signed and Sealed this

Twenty-fourth Day of September, 1991

Attest:

HARRY F. MANBECK, JR.

*Attesting Officer*        *Commissioner of Patents and Trademarks*